UNITED STATES PATENT OFFICE.

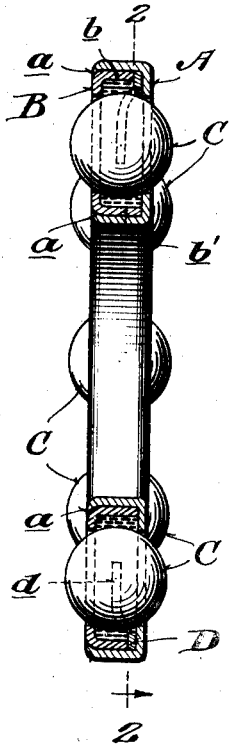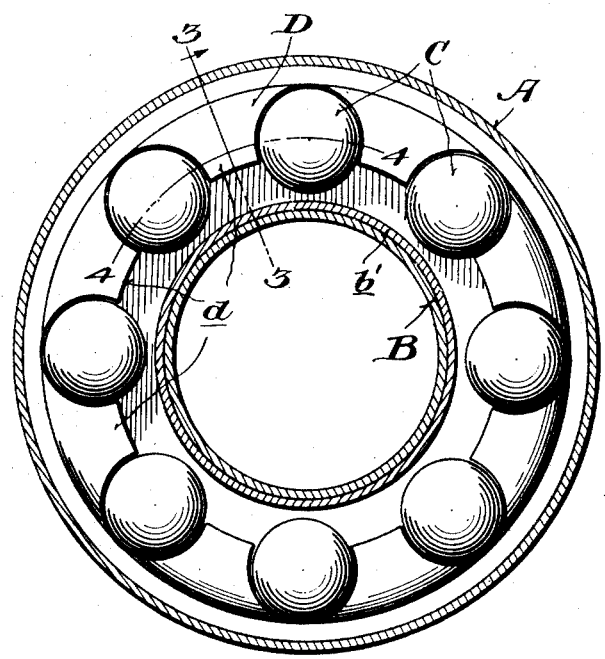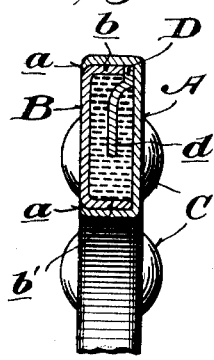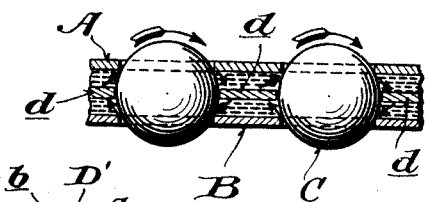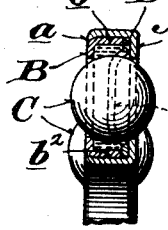

HENRY B. KEIPER, OF LANCASTER, PENNSYLVANIA; LUCY R. KEIPER, NANCY KEIPER LONG, AND GEORGE HAMMOND, EXECUTORS OF SAID HENRY B. KEIPER, DECEASED, ASSIGNORS TO NATIONAL BEARINGS COMPANY, OF LANCASTER, PENNSYLVANIA, A CORPORATION OF DELAWARE.

THRUST BALL-BEARING.

1,390,717.  Specification of Letters Patent.  Patented Sept. 13, 1921.

Application filed July 3, 1920. Serial No. 393,775.

*To all whom it may concern:*

Be it known that I, HENRY B. KEIPER, a citizen of the United States, residing at Lancaster, in the county of Lancaster and State of Pennsylvania, have invented certain new and useful Improvements in Thrust Ball-Bearings; and I do hereby declare the following to be a full, clear, and exact description of the invention, such as will enable others skilled in the art to which it appertains to make and use the same.

This invention relates to thrust bearings of the type used in automobiles and other vehicles and in various kinds of machines, for resisting end thrust, and more particularly to means for caging and holding the balls in separated relation, so as to prevent rolling contact thereof when in use in the bearings, together with means for holding oil or other lubricant in contact with the balls and at the same time effecting a circulation of the oil around the balls in such manner as to thoroughly lubricate the bearings and prevent waste of the lubricating material.

The primary object of the invention is to provide a simple, efficient and inexpensive device of the character referred to, adapted to hold the balls in separated relation within the bearing and to keep them surrounded with oil or grease which is caused to circulate around the balls and thus lubricate the bearing and at the same time prevent waste of the lubricant and the entrance of dust within the cage, with consequent wear and injury to the bearings.

The invention will first be hereinafter more particularly described, with reference to the accompanying drawings, which are to be taken as a part of this specification, and then pointed out in the claims at the end of the description.

In said drawings,

Figure 1 is a transverse sectional elevation of a ball thrust bearing embodying my invention;

Fig. 2 is a sectional side elevation of the same, taken on the line 2—2 of Fig. 1, looking in the direction of the arrow;

Fig. 3 is a detail sectional view, taken on the line 3—3 of Fig. 2; and

Fig. 4 is a fragmentary sectional view taken on the line 4—4 of Fig. 2, and indicating by means of arrows the direction of rotation of the balls and the method of effecting a circulation of oil or other lubricant through the bearing and around the balls.

Fig. 5 is a detail sectional view of a modification.

For the sake of clearness, the device is shown on a larger scale than the full sized bearing ordinarily used, though the size may vary according to requirements or the desires of the manufacturer or user of such devices.

Referring to said drawings, in which the same reference letters are used to denote corresponding parts in different views, the letters A and B, denote ring-shaped plates of different sizes, each having a series of apertures or openings therein of sufficient size to permit a corresponding series of balls C, arranged between the two plates, to protrude through said openings in opposite directions, with provision for free rotation of the balls thus confined in separated relation between the two plates. For the purpose of enlarging the ball retaining space, to permit greater freedom of movement of the balls, if desired, the metal around the openings may be swaged or bulged outwardly, though the openings so formed should be of smaller size than the balls to prevent the latter from escaping. The plates A and B are each formed with marginal annular flanges which are preferably, though not necessarily continuous entirely around the outer periphery and inner circumference of the plate and extend substantially at right angles toward the other plate, though in some cases it may be desirable to omit one of the flanges of one of the plates. The flanges of the smaller plate are adapted to fit snugly within the flanges of the outer plate, the flanges of which overlap the flanges of the inner plate and the two plates are rigidly secured together by swaging or bending the outer edges of the flanges of the outer ring over the periphery of the inner ring, as shown in Figs. 1 and 3 of the drawings. However, other means may be employed such as are commonly used in devices of a similar character, for securing the two plates together. The openings in the side plates may be arranged in circular form or in staggered relation, as desired, when more than one row or series of balls are used. As shown, the peripheral flange $b$ of the inner ring or plate B are somewhat shorter than the flange $b^1$ on its inner circumference, so that when inserted between the flanges of the larger ring or plate A, an annular recess will be provided between the edge of the flange $b$ and the inner wall of the outer plate, within which recess is fitted the peripheral portion of an annular spacing and oil distributing device D. The latter device, in the form shown consists of an annular plate having flaring projections $d$, between which the balls are seated in the spaced recesses thus provided, which are of substantially semicircular form to conform to the curvature of the balls, the portion of a circle described thereby being greater than a semicircle, but considerably less than a complete circle. The projections $d$ are bent or curved as shown in Fig. 3, so as to form a partition substantially equally dividing the annular space between the two plates, thus adapting the spacer to serve the double purpose of holding the balls in separated relation and in coöperation therewith, effecting a circulation of oil or grease in the narrow annular spaces on opposite sides of said partition between it and the inner walls of the two ring-shaped plates. The form of the spacing device, however, may be varied, that shown being merely a preferred form, and other means may be employed for rigidly securing the spacing and oil distributing device in the desired position to divide the space between the inner walls of the two rings or side plates into narrow annular oil circulating spaces of about equal width. To adapt the rings to hold the balls in proper position to permit them to rotate freely and prevent movement of one ring or plate toward the other beyond the desired limit at either its periphery or inner circumference, both flanges of the smaller ring should extend to and abut against the inner wall of the larger ring, or its shorter flange may abut against the peripheral portion of the spacer ring, as shown, thus adapting the two ring-shaped plates to serve as a means for firmly securing the spacer ring in a fixed position. The outer and inner flanges of the larger ring preferably extend the full width of and overlap the outer and inner flanges of the smaller ring, and have their edges swaged or bent over the outer margin or periphery of the smaller ring as shown in Figs. 1 and 3. The two rings might be held together sufficiently tightly solely by frictional contact of the flanges of one ring within the flanges of the other.

The device constructed as described is adapted to contain oil or other lubricant sufficient to fill the annular space within the two rings, so that the balls or the larger portions thereof will be in rolling contact with the lubricant, and in operation, as will be seen by reference to Fig. 4, all of the balls being adapted to rotate in the same direction, each ball tends to create a suction and forcing action in the direction of its rotation, thus causing the lubricant at one side of the partition to be carried over and around with the ball to the other side thereof where it is, so to speak, scraped off and then drawn over and around the next succeeding ball in the series, and so on throughout the entire series, while the lubricant on the other side of the partition is carried around with the balls and scraped off, so to speak, in the manner described and so on throughout the series of balls, thus causing a continuous circulation of the lubricant around the entire series of balls on both sides of the partition, so as to effect thorough lubrication of the bearing, the lubricant being prevented from escaping as it otherwise might and the circulation thereof being facilitated by capillary attraction and surface tension.

In Fig. 5 of the drawings I have shown a modification of the ball spacing and oil distributing device wherein, instead of having inwardly extending flaring projections which terminate at an intermediate point between the flanges of the channeled rings and clamping one edge only thereof between one of the flanges of the inner ring and the inner wall of the outer ring, as hereinbefore described, it is made to extend entirely across the space between the flanges of the channeled rings and has both its outer edge and its inner edge confined between the inner wall of the outer ring and the outer and inner flanges $b$ and $b^2$, respectively, of the inner ring while the openings therein are of circular form, so that the balls are entirely surrounded by the spacer $D^1$ about midway thereof, fitting loosely in said circular openings.

It will be understood, of course, that the form of the ring-shaped plates and the ball spacing and distributing device may be varied without departing from the spirit and scope of my invention, and I therefore do not desire to be limited to the specific construction shown and described.

Having thus described my invention, what I claim as new and desire to secure by Letters Patent of the United States is:

1. A self-lubricating thrust bearing comprising a plurality of ring-shaped plates, each having inner and outer marginal flanges extending toward the other plate and spaced openings between its flanges; one of said plates being of larger size than the other and having its flanges arranged to overlap the flanges of the smaller plate and together forming a receptacle for oil or grease, a series of balls between said plates protruding in opposite directions through said openings, and means for holding the balls in separated relation; said means extending along the median line of the series of balls and coöperating therewith for distributing a lubricant evenly and uniformly over the surface of the balls and effecting a circulation of the lubricant throughout the series of balls.

2. A ball thrust bearing comprising inner and outer annular plates of different sizes, each having inner and outer marginal flanges and a series of openings between its flanges through which a corresponding series of balls arranged between the two plates may protrude in opposite directions, the flanges of the larger plate overlapping the flanges of the smaller plate and having their outer edges swaged or bent over the periphery of the smaller plate, so as to secure the two plates and interposed balls together and prevent the plates from coming part; an annular plate having spaced projections forming a partition dividing the space between the two plates into two narrow annular oil circulating spaces and serving to hold the balls in separated relation, said partition coöperating with the balls in effecting a circulation of oil or other lubricant through said annular spaces and around the series of balls.

3. A self-lubricating ball thrust bearing comprising means for caging and holding a series of balls in separated relation projecting in opposite directions through registering openings in the outer walls of said caging means; the latter containing oil or other lubricant surrounding the balls, together with means extending along the median line of the series of balls and adapted to coöperate therewith in effecting a circulation of the lubricant in opposite directions around and on opposite sides of the central line of the balls.

4. A self-lubricating thrust ball bearing comprising a plurality of ring-shaped plates having oppositely disposed openings therein and marginal flanges and together forming an annular chamber, and an annular partition-plate having spaced projections dividing said chamber into narrow passages on opposite sides thereof for oil or other lubricant, and a series of balls between said plates projecting in opposite directions through said openings; said partition plate serving to separate the balls and to effect a circulation of the oil or other lubricant along said passages around the series of balls.

5. A self-lubricating ball thrust bearing comprising a ring-shaped plate having a series of openings therein and marginal flanges projecting therefrom at an angle thereto, a smaller plate of substantially the same construction as the larger plate having its flanges fitting closely within the flanges of the larger plate, and an annular partition dividing the greater portion of the space between the two plates into two annular oil circulating chambers, said partition being adapted to hold the balls in separated relation and to coöperate therewith in effecting a circulation of the oil through said spaces and around the series of balls on opposite sides thereof.

6. A ball thrust bearing comprising two ring-shaped plates of different sizes fitting one within the other and rigidly secured together, and an annular partition plate dividing the space between the two plates so as to form annular oil chambers on opposite sides thereof, said partition being adapted in coöperation with the balls to effect a circulation of the oil through said chambers and around the series of balls on opposite sides.

7. A ball thrust bearing comprising two annular plates of different sizes, each having laterally projecting inner and outer marginal flanges turned toward the other plate, and a series of openings between its flanges, the flanges of one plate being arranged within the flanges of the other, a series of balls arranged between the two plates and protruding in opposite directions through said openings, the outer flange of the inner plate terminating short of the inner wall of the outer plate, and an annular plate having spaced flaring inwardly extending projections and having its peripheral portion clamped between the shorter flange of said inner plate and the inner wall of said outer plate; said annular plate being adapted to hold the series of balls in separated relation between said projections and to effect a circulation of oil along the spaces on opposite sides thereof and around the series of balls.

In testimony whereof I affix my signature in the presence of two witnesses.

HENRY B. KEIPER.

Witnesses:
 Ed Donohoe,
 A. M. Smith.